3,515,588
ELECTRICAL COMPONENT AND METHOD OF MAKING THE SAME
Fred S. Sadler, Zanesville, Ohio, assignor to McGraw-Edison Company, Milwaukee, Wis., a corporation of Delaware
No Drawing. Filed Mar. 27, 1967, Ser. No. 625,944
Int. Cl. B44d 1/18
U.S. Cl. 117—230                                   15 Claims

---

ABSTRACT OF THE DISCLOSURE

This invention relates to an electrical component comprising an electrical conductor having an insulating coating bonded thereto. The coating, in general, is composed of a protein material, a protein insolubilizer, and a plasticizer, and the dried coating is tightly adherent to the conductor, has excellent dielectric breakdown strength and thermal stability, and is sufficiently flexible to permit the conductor to be flexed without cracking of the coating.

---

Due to the shortage and the relatively high cost of copper, manufacturers of transformer coils have recently turned to aluminum strips coated with thermosetting resins, such as epoxy resins, as a replacement for the copper magnet wire. However, strips of this type have not proven entirely satisfactory because the epoxy coating deteriorates rapidly when subjected to thermal and hydrolytic conditions encountered in transformers. It is well established that there is a gradual accumulation of water in a transformer over a period of years. This water may have its origin from the degradation of the dielectric insulating material, such as cellulosic pressboard, used in the transformer, or the moisture can result from condensation of atmospheric moisture during the normal temperature cycling that occurs in operating transformers. Regardless of the source of this water, the aluminum strip coated with epoxy resin, when subjected to the thermal and hydrolytic conditions encountered in a transformer, will tend to peel and crumble from the metal strip.

The present invention is directed to an electric component, comprising an electrical conductor coated with an insulating protein coating. The coating of the invention adheres firmly to the metallic conductor and at the same time is flexible and has excellent abrasion resistance. Moreover, the insulating coating has a dielectric breakdown strength that exceeds 400 volts per mil of thickness, and has outstanding thermal stability so that the coating will substantially retain its physical properties after being subjected to the thermal cycles encountered in a transformer or other electrical apparatus.

The metallic conductor to which the coating is applied can take the form of an electrically conductive material generally used in electrical apparatus, such as aluminum, copper, steel or the like.

The coating, generally, consists of a protein material, an insolubilizer for the protein material and a plasticizer.

The protein material to be used in the coating may take the form of an isolated soy protein, a collagen derived protein, casein, egg albumin, lactalbumin or the like. As the coating composition is preferably applied to the conductor in the form of an aqueous solution, the protein should be water soluble. As casein is only sparingly soluble in water, but is soluble in alkaline solution, an alkaline material, such as ammonium hydroxide, can be employed with the casein to solubilize the casein in the aqueous treating solution.

The water and abrasive resistance of the dried coating is obtained through the insolubilizer which reacts with the protein to decrease the solubility of the protein material in water. The protein insolubilizers are, in general, aldehydes or aldehyde derivatives and it is preferred not to use protein insolubilizers containing metallic ions for the metallic ions may adversely affect the dielectric properties of the coating. The insolubilizer may take the form of formaldehyde, glyoxal, dialdethyde starches, hexamethylenetetramine, paraformaldehyde, acrolein, crotonaldehyde, dimethylol urea, and the like.

The protein insolubilizer reacts with the protein to improve the initial water resistance of the coating and to accelerate the development of a high degree of water resistance in the dried coating.

The plasticizer serves to increase the flexibility of the coating and any conventional plasticizers which are compatible with the protein and protein insolubilizer can be employed, such as propylene glycol, dipropylene glycol, hydroxy propylene glycol, di-N-hexyl azelate, dibutyl sebacate, dioctyl adiphate, dibutyl phthalate, sorbitol, mannitol, diethylene glycol, polyethylene glycol, trisdichloropropyl phosphate, triacetin, glycerol, glyceryl monooleate, and the like.

In the dried coating, the protein insolubilizer comprises from 2 to 28% and preferably about 6%, while the plasticizer comprises from 0.5% to 28%, and preferably about 25% by weight of the dried coating.

It has been found that cationic starches can be substituted for all or a part of the protein material in the above formulations. The cationic starches are starch derivatives which contain functional groups that provide a positive charge on the starch and thus attract it to the negatively charged materials. However, it should be noted that there are many compounds which, though technically not cationic starch derivatives, resemble them in many ways. Examples of these are the cationic, water-soluble, polymeric carbohydrates sold by the Hercules Powder Company of Wilmington, Del., under their Ceron CN trademark and grade designation as described in the U.S. Pat. 3,070,594. Accordingly, the term "cationic starch" as used herein shall be understood to include these other starch-like, cationic materials.

Additional hardness and abrasive resistance can be obtained in the protein coating by the inclusion of a material such as ammonium hydroxide, formamide, or dimethyl formamide. If a hardening agent such as this is to be employed, it is used in an amount of about 3 to 28% by weight of the dried coating and preferably about 13.5%. As previously mentioned, the ammonium hydroxide will also act to solubilize the casein, if casein is used as all or a portion of the protein material.

Water soluble resin emulsions can also be added to the coating composition, such as an acrylic resin emulsion, urea-formaldehyde latex or polyvinyl alcohol. The acrylic emulsion acts primarily as a film former that aids in abrasion resistance and also contributes to the overall strength of the film. The urea-formaldehyde latex serves a similar function but also serves to insolubilize the cationic starch and the protein. The resin emulsion based on 100% solids is generally used in an amount of 1 to 30% by weight of the protein or starch.

The addition of a surface active agent to the coating composition has been found to improve the wetting of the metallic conductor surface and thereby improve the adhesion of the coating to the conductor. Any conventional wetting agent can be employed, such as Triton X–100 sold by Rohm and Haas, which is a 9–10 mol ratio ethoxylated octyl phenol. Other wetting agents which can be used are ethoxylated lauryl alcohol or ethylene oxide derived non-ionic surfactants, such as those disclosed on page 56 of Surface Chemistry, Lloyd I. Osipon, Reinhold Publishing Company. The wetting agent is generally employed in an amount of 0.02% to 0.15% by weight of the protein.

The coating composition is generally applied to the conductor in the form of an aqueous solution by brushing, spraying, dipping, or the like. The preferred coating method is a dipping operation in which the coating thickness is controlled by an air knife or doctor blade.

The amount of water to be used in the aqueous solution is not critical and can vary within wide limits. Generally, the water can comprise from 40% to 90% by weight of the aqueous solution. After application of the aqueous solution to the metallic conductor, the coated conductor is heated at an elevated temperature, generally in the range of 110 to 170° C. to evaporate the water.

It has been found that the evaporation of the solvent can be accelerated by employing an organic, water soluble solvent in conjunction with the water. Solvents such as methyl ethyl ketone, acetone, or the like, can be substituted for a portion of the water in the treating solution. Generally, the organic solvent will comprise from 5 to 85% by weight of the water in the aqueous solution. The addition of the organic solvent will accelerate the drying operation which is desirable from a production standpoint.

The hardness and water resistance of the coating can be further improved by employing an overwash technique. The overwash can be carried out by applying a solution of the protein insolubilizer, preferably formaldehyde, to the partially dried or completely dried coating. The overwash solution can be sprayed, brushed, or flowed onto the coated strip and subsequently dried to insure a reaction between the coating and the insolubilizer. The overwash treatment serves not only to further increase the hardness and water resistance of the coating, but also the abrasion resistance.

The thickness of the coating is not critical and can generally vary from about 0.2 mil to 20 mils. However, as the thickness of the coating is increased, it may be necessary to reduce the proportion of solvent in the aqueous solution in order to uniformly apply the coating composition and permit drying within a reasonable period of time. For most applications, the coating has a thickness in the range of 0.5 to 2 mils.

The resulting dried coating on the conductor is electrically insulating, tightly adherent and sufficiently flexible so that the conductor can be bent or flexed without the coating cracking or peeling. Moreover, the coating has a dielectric breakdown strength above 400 volts per mil of thickness and has outstanding thermal stability so that the coating will substantially retain its physical properties after being exposed to transformer oil for a period of 120 hours at 170° C.

The coating is extremely resistanct to water, particularly if an overwash technique is employed, so that the water normally encountered in a transformer will not deteriorate or destroy the coating after long periods of use.

The following examples illustrate the fabrication of coated metallic conductors in accordance with the invention.

EXAMPLE NO. 1

Twenty grams (20) of protein colloids (Swift & Co. technical grade 5–V) was dissolved in 74 grams of distilled water, and six (6) grams of triacetin were added to this solution. One drop of Rohm & Haas' Triton X–100 surface active agent was added to this solution and mixed thoroughly. This solution was applied to an etched aluminum strip and the thickness of the coating adjusted with a calibrated roller to a value of 2 mils. The film was dried by using a forced draft oven at 170° C. for 5 minutes. The resulting dried film was abrasive resistant, had good adhesion, good flexibility and a dielectric breakdown strength of 650 volts per mil.

EXAMPLE NO. 2

Ten (10) grams of protein colloid (Swift & Co. Colloid 5–U), 3 grams tris-dichloropropyl phosphate, 2 grams glycerine (99.5%), 0.3 gram of dialdehyde starch (Dasol A) were dissolved in 70 grams of distilled water. One drop of Triton X–100 was added and mixed thoroughly. The aqueous solution was applied to an aluminum strip and dried in the manner of Example No. 1. The dried coating showed excellent film properties and had excellent adhesion, flexibility and abrasive resistance.

EXAMPLE NO. 3

Five (5) grams of refined casein was dissolved in 91 grams of distilled water containing 2.0 grams of ammonium hydroxide (26° Bé.) and 2.0 grams of dimethyl formamide. When the casein was dissolved at 140° F., 0.5 gram of dialdehyde starch (Dasol A), 2 grams of acrylic emulsion (36% solids) (NeoCryl SR 285), 2.8 grams of tris-dichloropropyl phosphate. 2.8 grams of glycerine and 1 drop of Triton X–100 were added and mechanically stirred until solution was complete. The coating of this composition on aluminum strip showed good flexibility, good adhesion, good abrasive on resistance and good dielectric breakdown strength after washing the partially-dried film with formaldehyde and subjecting the film to a complete drying cycle as in Example No. 1.

EXAMPLE NO. 4

A coating composition was prepared in the manner of Example No. 3 and had the following composition:

| | Grams |
|---|---|
| Casein (refined) | 5.0 |
| Ammonium hydroxide (26° Bé.) | 2.0 |
| Dimethyl formamide | 2.0 |
| Dialdehyde starch (Dasol A) | 0.2 |
| Urea-formaldehyde latex | 2.0 |
| Tris-dichloropropyl phosphate | 2.8 |
| Glycerine | 2.8 |
| Water (distilled) | 91.0 |

Triton X–100, 1 drop.

The above coating on aluminum strip showed excellent adhesion, flexibility, abrasive resistance, and good dielectric breakdown strength when the partially-dried film was over-washed with formaldehyde or glyoxal and the drying completed at 170° C. for 5 minutes.

EXAMPLE NO. 5

A coating composition was prepared in the manner of Example No. 3 and had the following composition:

| | Grams |
|---|---|
| Casein (refined) | 7.0 |
| Ammonium hydroxide (26° Bé.) | 2.5 |
| Formamide | 2.0 |
| Dialdehyde starch (Dasol A) | 0.2 |
| Tris-dichlorophopyl phosphate | 2.8 |
| Glycerine | 2.8 |
| Water (distilled) | 91.0 |

Triton X–100, 1 drop.

The coating when applied to aluminum strip and dried in the manner of Example No. 1 showed excellent adhesion, flexibility, abrasion resistance, and dielectric break down strength.

EXAMPLE NO. 6

A coating composition was prepared in the manner of Example No. 3 and had the following composition:

| | Grams |
|---|---|
| Isolated soy protein | 5.0 |
| Ammonium hydroxide (26° Bé.) | 2.0 |
| Dimethyl formamide | 2.0 |
| Dialdehyde starch (Dasol A) | 0.2 |
| Acrylic emulsion (36% solids) NeoCryl SR285 | 2.0 |
| Glycerine | 3.8 |
| Water (distilled) | 90.0 |

Triton X-100, 1 drop.

The partially dried film from this composition was overwashed with a 5% (by weight) glyoxal solution and the drying cycle completed at 170° C. The film properties from this formulation were excellent.

EXAMPLE NO. 7

A coating composition was prepared in the manner of Example No. 3 and had the following composition:

| | Grams |
|---|---|
| Protein colloid (Swift 5V) | 6.0 |
| Aminized starch Ceron CN | 2.0 |
| Dimethyl formamide | 2.0 |
| Glycerine | 1.0 |
| Water (distilled) | 90.0 |

Triton X-100, 1 drop.

The coating was applied to aluminum strip, partially dried at 170° C., overwashed with formaldehyde and the drying cycle completed. Excellent insulating film properties were obtained in the coating.

EXAMPLE NO. 8

A coating composition was prepared in the manner of Example No. 3 and had the following composition:

| | Grams |
|---|---|
| Casein (refined) | 5.0 |
| Ammonium hydroxide (26° Bé.) | 2.0 |
| Dimethyl formamide | 2.0 |
| Dialdehyde starch (Dasol A) | 0.2 |
| Acrylic emulsion (36% solids) | 2.0 |
| Glycerine | 3.8 |
| Methyl ethyl ketone | 45.0 |
| Water | 46.0 |

Triton X-100, 1 drop.

The coating composition was applied to aluminum strip and dried as in the previous examples, and the addition of the methyl ethyl ketone resulted in a 50% reduction in drying time. The film properties were excellent.

Various modes of carrying out the invention are contemplated as being within the scope of the following claims particularly pointing out and distinctly claiming the subject matter which is regarded as the invention.

I claim:

1. An electrical instrumentality comprising an electrical conductor, and a dry electrically insulating coating bonded to a surface of said conductor, said coating having an electrical breakdown strength of over 400 volts per mil of thickness of said coating and being capable of substantially retaining its physical properties when subjected to transformer oil at a temperature of 170° C. for 120 hours, said coating comprising the combination of a material selected from the group consisting of a protein and a cationic starch, an insolubilizing agent capable of reacting with said material to render the material substantially insoluble to water, and a plasticizer compatible with said material and said insolubilizing agent and capable of increasing the flexibility of the coating, said insolubilizing agent comprising from 2.0% to 28.0% by weight of the dried coating, said plasticizer comprising from 0.5 to 28.0% by weight of the dried coating and said material being the balance of the dried coating.

2. The electrical instrumentality of claim 1, in which said insolubilizer comprises from 2 to 28% by weight of said dried coating and said plasticizer comprises from 0.5 to 28.0% by weight of said dried coating.

3. The electrical apparatus of claim 2, in which said dried coating also includes from 3 to 28% by weight of a substance selected from the group consisting of ammonium hydroxide, formamide and dimethyl formamide.

4. The instrumentality of claim 1, in which said coating has a thickness in the range of 0.2 mil to 20 mils.

5. The instrumentality of claim 1, in which said conductor is selected from the group consisting of copper and aluminum.

6. The instrumentality of claim 1, in which said insolubilizer is selected from the group consisting of dialdehyde starches, formaldehyde, glyoxal and hexamethylene tetramine, paraformaldehyde, acrolein, crotonaldehyde, dimethyl urea, and mixtures thereof.

7. The instrumentality of claim 1, in which said protein is selected from the group consisting of casein, soy protein, a protein collagen, egg albumin and lactalbumin.

8. A method of forming an electrical instrumentality, comprising the step of bonding to a metallic conductor an electrically insulating coating, said coating comprising a material selected from the group consisting of a water soluble proteinaceous substance and a cationic starch, an insolubilizing agent capable of reacting with said material to render said material substantially insoluble in water, and a plasticizer compatible with said material and said insolubilizing agent and capable of increasing the flexibility of the coating, the dried coating having an electrical breakdown strength above 400 volts per mil of thickness of said coating and said coating being capable of substantially retaining its physical properties when subjected to transformer oil at a temperature of 170° C. for 120 hours, said dried coating consisting essentially of 2.0% to 28.0% by weight of the insolubilizing agent, 0.5% to 28.0% by weight of the plasticizer and the balance being said material.

9. The method of claim 8, in which the coating is applied to the conductor with an evaporable carrier and said carrier is subsequently evaporated to provide said dried coating.

10. The method of claim 9, in which said evaporable carrier is water.

11. The method of claim 9, in which said carrier is a water solution containing a water soluble organic solvent, said solvent being present in an amount of 5% to 85% by weight of said water.

12. A method of forming an electrical instrumentality, comprising the steps of applying a water solution to a surface of a metallic conductor to form a coating thereon, said water solution having dissolved therein a material selected from the group consisting of a protein and a cationic starch, an insolubilizing agent capable of reacting with said material to render said material substantially insoluble in water, and a plasticizer compatible with said material and said insolubilizing agent, and drying said coating to evaporate said water and provide a dried coating on said conductor, the dried coating having excellent water resistance, having an electrical breakdown strength above 400 volts per mil of thickness of said coating and said coating being capable of substantially retaining its physical properties when subjected to transformer oil at a temperature of 170° C. for 120 hours, said dried coating consisting essentially of 2.0% to 28.0% by weight of the insolubilizing agent, 0.5% to 28.0% by weight of the plasticizer and the balance being said material.

13. The method of claim 12, in which said aqueous solution also contains a resin emulsion.

14. The method of claim 12, in which the aqueous solution also contains a wetting agent, said wetting agent being present in an amount of 0.02% to 0.15% by weight of said material.

15. The method of claim 12, and including the step of washing the partially dried or fully dried coating with a liquid containing said insolubilizing agent to further increase the water resistance of the dried coating.

References Cited
UNITED STATES PATENTS
2,576,921   12/1951   Buscher _____ 117—164

WILLIAM L. JARVIS, Primary Examiner

U.S. Cl. X.R.

106—139, 146, 157, 210; 117—110, 164, 165